United States Patent
Newcomb

(10) Patent No.: US 8,845,868 B2
(45) Date of Patent: Sep. 30, 2014

(54) SEAL AND FIXATION ASSEMBLY FOR A ROTATING CYLINDRICAL MAGNETRON ELECTRODE

(75) Inventor: Richard Newcomb, McKeesport, PA (US)

(73) Assignee: Angstrom Sciences, Inc., Duquesne, PA (US)

( * ) Notice: Subject to any disclaimer, the term of this patent is extended or adjusted under 35 U.S.C. 154(b) by 492 days.

(21) Appl. No.: 13/309,627

(22) Filed: Dec. 2, 2011

(65) Prior Publication Data

US 2012/0146504 A1   Jun. 14, 2012

Related U.S. Application Data

(60) Provisional application No. 61/419,678, filed on Dec. 3, 2010.

(51) Int. Cl.
*C23C 14/35*   (2006.01)
(52) U.S. Cl.
USPC .............. 204/298.21; 204/298.19; 204/298.2; 204/298.22

(58) Field of Classification Search
USPC ............... 204/298.21, 298.22, 298.19, 298.2; 315/39.51, 39.61
See application file for complete search history.

(56) References Cited

U.S. PATENT DOCUMENTS

2008/0012460 A1   1/2008   Bernick et al.
2009/0260983 A1 * 10/2009   Bernick .................. 204/298.13

* cited by examiner

*Primary Examiner* — Tuyet Thi Vo
(74) *Attorney, Agent, or Firm* — The Webb Law Firm

(57) ABSTRACT

A seal and fixation assembly includes a cylindrical target having an inside surface with a shoulder that forms a stop within the target. A target retaining ring is disposed about the target. A seal plate is disposed within the target and engages the stop and the inside surface of the target. An end cap is disposed on the end of the target and includes a portion with a beveled surface within the target. A sealing element is disposed between the inside surface of the target, the seal plate, and the beveled surface of the end cap. A clamp is disposed over the end cap and the target retaining ring. Engagement of the end cap and the target retaining ring with the clamp causes the end cap to move within the target toward the stop to compress the sealing element between the target, the seal plate, and the beveled surface.

16 Claims, 7 Drawing Sheets

SEAL AND FIXATION ASSEMBLY FOR A ROTATING CYLINDRICAL MAGNETRON ELECTRODE

CROSS REFERENCE TO RELATED APPLICATIONS

This application claims the benefit of U.S. Provisional Patent Application No. 61/419,678, filed Dec. 3, 2010, and titled "Seal and Fixation Assembly for a Rotating Cylindrical Magnetron Electrode". This application is related to the subject matter disclosed in U.S. Provisional Patent Application No. 61/298,613, filed Jan. 27, 2010, and titled "Seal and Fixation Assembly for a Rotating Cylindrical Magnetron Electrode". The disclosures of Application No. 61/419,678 and of Application No. 61/298,613 are incorporated herein by reference in their entirety.

BACKGROUND OF THE INVENTION

1. Field of the Invention

The present invention relates to a seal and fixation assembly for closing and sealing the ends of a cylindrical electrode target of a rotating cylindrical magnetron electrode. More particularly, the present invention relates to a seal and fixation assembly that utilizes an internal sealing element disposed between three sealing surfaces in a conical gland seal design.

2. Description of Related Art

Typical seal assemblies for placement at the ends of cylindrical electrode targets of a rotating cylindrical magnetron electrode assembly utilize an external sealing arrangement to provide a vacuum and water seal to the interior of the cylindrical target. In order to avoid damage to the sealing element during assembly and operation of the electrode, a smaller sealing element is provided. However, the external sealing surfaces tend to scratch during assembly and operation, thus reducing the effectiveness of the seal.

As is appreciated by those skilled in the art, it would be advantageous to provide a seal arrangement for a rotating cylindrical magnetron electrode that does not have the limitations of the presently available seals.

SUMMARY OF THE INVENTION

The present invention provides for a seal and fixation assembly for a rotating cylindrical magnetron target that includes a sealing element disposed between an interior surface of the cylindrical target, a seal plate disposed within a hollow interior of the target, and a beveled surface of an end cap, thus creating a conical gland seal design.

According to an embodiment of the present invention, a seal and fixation assembly for a rotating cylindrical magnetron electrode is provided. The seal and fixation assembly includes a cylindrical target having an exterior and a hollow interior defining an inside surface of the cylindrical target. The inside surface includes an internal shoulder proximate to an end of the cylindrical target that forms a stop within the hollow interior of the target. A target retaining ring is disposed about the exterior of the cylindrical target. The target retaining ring has an external tapered surface. A seal plate is disposed within the hollow interior of the cylindrical target. The seal plate engages the stop and the inside surface of the cylindrical target. An end cap is disposed on the end of the cylindrical target. The end cap includes an external portion engaging the exterior of the cylindrical target and an internal portion engaging the inside surface of the cylindrical target. The external portion includes an external tapered surface and the internal portion includes a beveled surface. A sealing element is disposed between and engages the inside surface of the cylindrical target, the seal plate, and the beveled surface of the internal portion of the end cap. A clamp is disposed on the end of the cylindrical target over the end cap and the target retaining ring. The clamp includes a pair of opposing internal tapered surfaces that respectively engage the external tapered surfaces of the end cap and the target retaining ring. Engagement of the end cap and the target retaining ring with the clamp causes the internal portion of the end cap to move within the hollow interior of the cylindrical target in a direction toward the stop so that the sealing element becomes compressed between the inside surface of the cylindrical target, the seal plate, and the beveled surface of the internal portion of the end cap.

The invention further relates to a cylindrical magnetron electrode including, among other things, an elongated cylindrical member having a first end and an opposite second end, an exterior and a hollow interior defining an inside surface of the cylindrical member, the inside surface including a first internal shoulder proximate to the first end of the cylindrical member forming a first stop within the hollow interior of the member and a second internal shoulder proximate to the second end of the cylindrical member forming a second stop within the hollow interior of the member spaced from the first step; a magnet mounted within the cylindrical member between and spaced from the first and the second stops; a first target retaining ring disposed about the exterior of the cylindrical member adjacent the first end, the first target retaining ring having an external tapered surface facing in the direction of the second end; a second target retaining ring disposed about the exterior of the cylindrical member adjacent the second end, the second target retaining ring having an external tapered surface facing in the direction of the first end; a first seal plate disposed within the hollow interior of the cylindrical target at the first end, the first seal plate engaging the first stop and a portion of the inside surface of the cylindrical member at the first end; a first end cap disposed on the first end of the cylindrical member, the first end cap including an external portion engaging the exterior of the cylindrical member at the first end and an internal portion engaging the inside surface of the cylindrical member at the first end, wherein the external portion of the first end cap includes an external tapered surface and the internal portion includes a beveled surface; a first sealing element disposed between and engaging the inside surface of the cylindrical member at the first end, the first seal plate, and the beveled surface of the internal portion of the first end cap; a first clamp disposed on the first end of the cylindrical member over the first end cap and the first target retaining ring, the first clamp including a pair of opposing internal tapered surfaces that respectively engage the external tapered surfaces of the first end cap and the first target retaining ring; a second seal plate disposed within the hollow interior of the cylindrical target at the second end, the second seal plate engaging the second stop and a portion of the inside surface of the cylindrical member at the second end; a second end cap disposed on the second end of the cylindrical member, the second end cap including an external portion engaging the exterior of the cylindrical member at the second end and an internal portion engaging the inside surface of the cylindrical member at the second end, wherein the external portion of the second end cap includes an external tapered surface and the internal portion includes a beveled surface; a second sealing element disposed between and engaging the inside surface of the cylindrical member at the second end, the second seal plate, and the beveled surface of the internal portion of the second end cap; and a second clamp disposed on the second end of the cylindrical member over the second end cap and the second target retaining ring, the second clamp including a pair of opposing internal tapered surfaces that respectively engage the external tapered surfaces of the second end cap and the second target retaining ring, wherein engagement of the first end cap and the first target retaining ring with the first clamp causes the internal portion of the first end cap to move within the hollow interior of the cylindrical member at the first end in a direction toward the first stop so that the first sealing element becomes compressed between the inside surface of the cylindrical member at the first end, the first seal plate, and the beveled surface of the internal portion of the first end cap and engagement of the second end cap and the second target retaining ring with the second clamp causes the internal portion of the second end cap to move within the hollow interior of the cylindrical member at the second end in a direction toward the second stop so that the second sealing element becomes compressed between the inside surface of the cylindrical member at the second end, the second seal plate, and the beveled surface of the internal portion of the second end cap.

The invention still further relates to a method of sealing at least a first end of a rotating cylindrical magnetron electrode having a first end and an opposite second end. The method including, among other things, providing a cylindrical target having the first end and the second end, and an exterior and a hollow interior defining an inside surface of the cylindrical target, the inside surface including a first internal shoulder proximate to the first end of the cylindrical target forming a first stop within the hollow interior of the target and a second internal shoulder proximate to the second end of the cylindrical target forming a second stop within the hollow interior of the target; disposing a first target retaining ring about the exterior of the cylindrical target adjacent the first end, the first target retaining ring having an external tapered surface; disposing a first seal plate within the hollow interior of the cylindrical target to engage the first stop and the inside surface of the cylindrical target; disposing a first end cap on the first end of the cylindrical target, the first end cap including an external portion to engage the exterior of the cylindrical target adjacent the first end and an internal portion engaging the inside surface of the cylindrical target adjacent the first end, wherein the external portion includes an external tapered surface and the internal portion includes a beveled surface; disposing a first sealing element between and engaging the inside surface of the cylindrical target, the seal plate, and the beveled surface of the internal portion of the first end cap; and disposing a first clamp on the first end of the cylindrical target over the first end cap and the first target retaining ring, the first clamp including a pair of opposing internal tapered surfaces that respectively engage the external tapered surfaces of the end cap and the target retaining ring, wherein engagement of the first end cap and the first target retaining ring with the first clamp causes the internal portion of the first end cap to move within the hollow interior of the cylindrical target in a direction toward the first stop so that the sealing element to compress the inside surface of the cylindrical target, the seal plate, and the beveled surface of the internal portion of the end cap.

Further details and advantages of the invention will become clear upon reading the following detailed description in conjunction with the accompanying drawing figures, wherein like parts are designated with like reference numerals throughout.

DETAILED DESCRIPTION OF THE INVENTION

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter can assume many alternative variations and embodiments. It is also to be understood that the specific devices illustrated in the accompanying drawing figures and described herein are simply exemplary and should not be considered as limiting.

Figure 1:
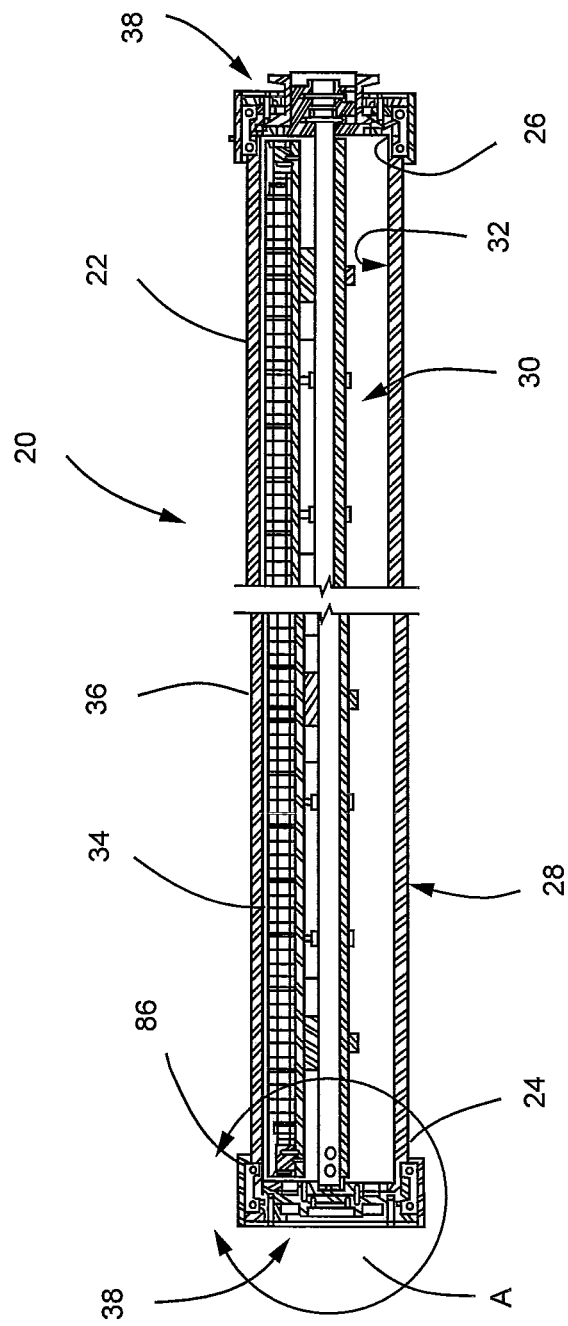
FIG. 1 is a longitudinal cross-sectional view of a non-limiting embodiment of a rotating cylindrical magnetron electrode of the present invention, the cross-sectional view is taken along the longitudinal axis of the cylindrical magnetron electrode.

With reference to FIG. 1, a rotating cylindrical magnetron electrode 20, according to an embodiment of the present invention, is shown. In the following discussion, the electrode 20 is designed for use in a cylindrical magnetron of the type disclosed in United States Patent Application Publication Nos. 2008/0012460 entitled "Magnetron for Cylindrical Targets" (hereinafter also referred to "USPP 2008/0012460") and 2009/0260983 entitled "Cylindrical Magnetron" (hereinafter also referred to as "USPP 2009/0260983"), which are assigned to the Assignee of the present application. USPP 2008/0012460 and USPP 2009/0260983 in their entirety are incorporated herein by reference. The rotating cylindrical magnetron electrode 20 includes a cylindrical target 22 of the type disclosed in USPP 2008/0012460 and USPP 2009/0260983. Although the non-limiting embodiments of the invention are discussed for use with cylindrical magnetrons of the type disclosed in USPP 2008/0012460 and USPP 2009/0260983, the invention is not limited thereto and can be used with any type of sputtering apparatus using cylindrical magnetron electrodes and with any type of cylindrical magnetron electrode.

Figure 2:
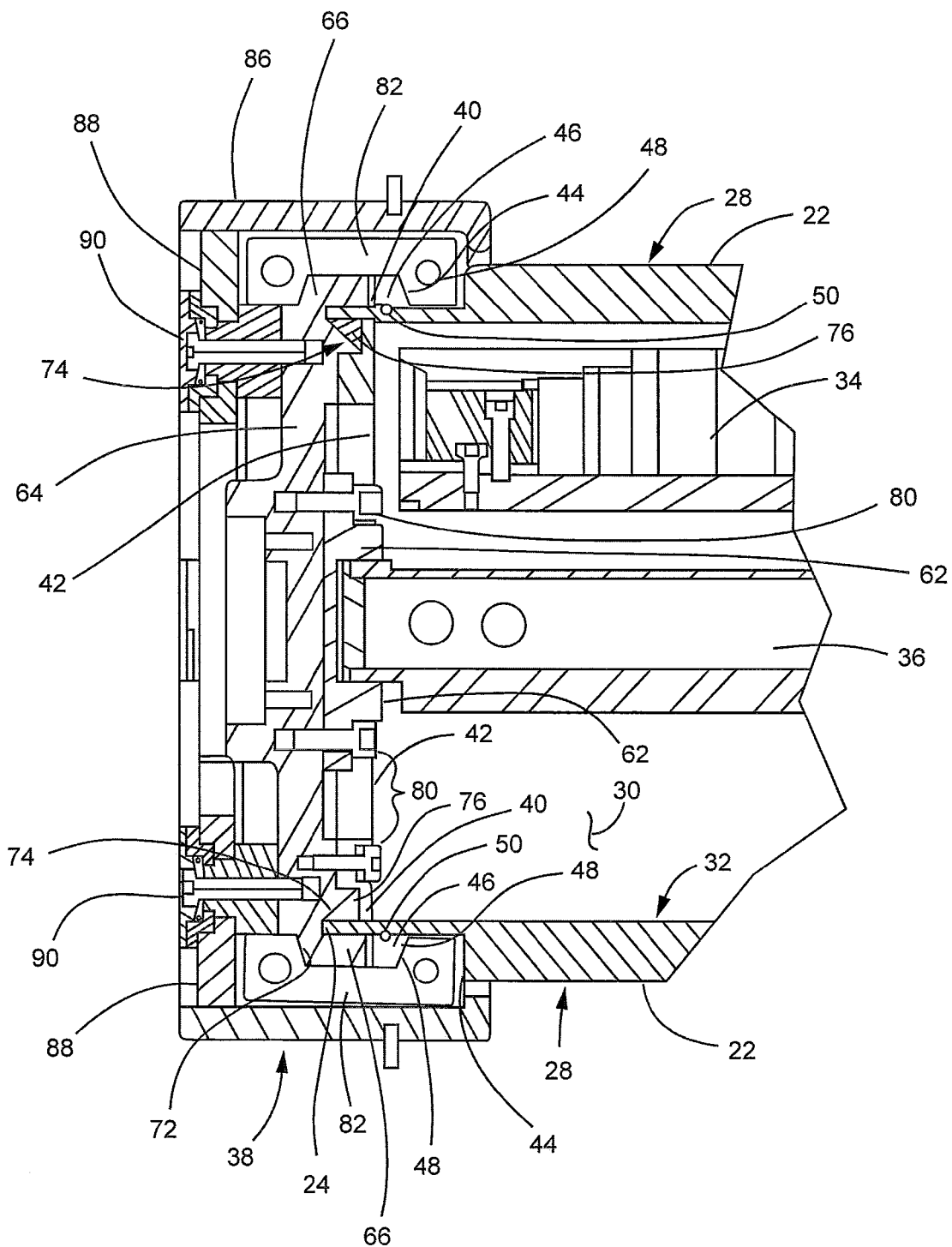
FIG. 2 is a schematic representation of a lower portion of the end of the cylindrical target shown in FIG. 1 showing a portion of the seal and fixation assembly of the invention, the schematic representation shown in FIG. 2 is a mirror image of the lower portion of FIG. 1 rotated 180 degrees.
Figure 3:
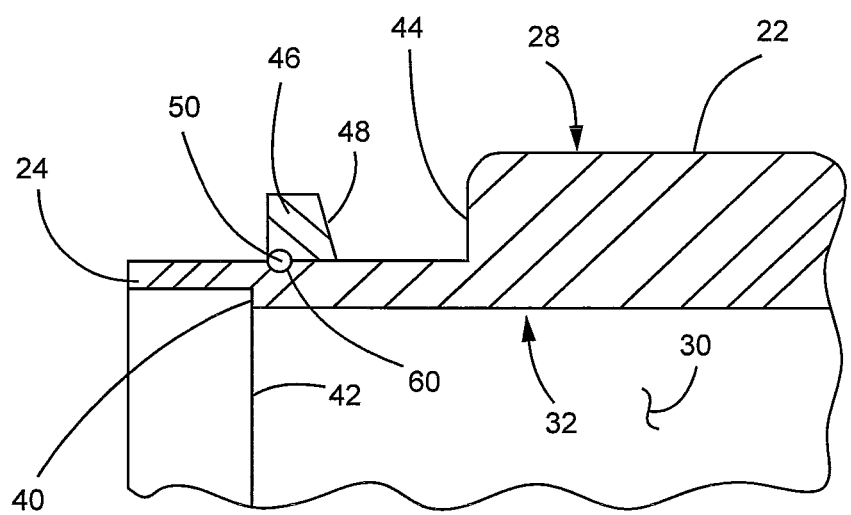
FIG. 3 is a schematic representation of another portion of the seal and fixation assembly of the invention shown in FIG. 2.

With reference to FIGS. 1-3 as needed, the cylindrical target 22 extends between a first end 24 and a second end 26. The cylindrical target 22 has an exterior 28 and a hollow interior 30, which defines an inside surface 32 of the cylindrical target 22. A magnet 34, as described in USPP 2008/0012460 and USPP 2009/0260983, is disposed within the hollow interior 30 of the cylindrical target 22. A drive shaft 36 for rotating the electrode 20 as described in USPP 2008/

0012460 and USPP 2009/0260983 extends across the length of the cylindrical target 22. A non-limiting embodiment of a seal and fixation assembly 38 of the invention for closing off and sealing the interior of the cylindrical target 22 is attached at each end 24, 26 of the cylindrical target 22. Both seal and fixation assemblies 38 are substantially similar in structure and operation. Accordingly, further discussion will be directed to the seal and fixation assembly 38 disposed on the first end 24 of the cylindrical target 22, with the appreciation that the discussion applies equally to the assembly 38 disposed on the second end 26 of the cylindrical target 22.

As shown in FIGS. 2 and 3, the seal and fixation assembly 38 includes the end 24 of the cylindrical target 22. Proximate to the end 24 of the cylindrical target 22, the inside surface 32 of the cylindrical target 22 includes an internal shoulder 40 (clearly shown in FIG. 3) formed therein such that the inner diameter of the target 22 is greater at the end 24. The internal shoulder 40 forms a stop 42 within the hollow interior 30 of the target 22. Further, an external shoulder 44 is formed in the exterior 28 of the target 22 proximate to the end 24 of the target 22 so that the outer diameter of the target 22 is smaller at the end 24. A target retaining ring 46 is disposed about the exterior 28 of the target 22 adjacent to the end 24 of the target 22 and includes an external tapered surface 48 facing opposite to the end 24 of the target 22. The target retaining ring 46 is retained in its position by a wire 50 disposed within a radial groove 60 formed in the exterior 28 of the cylindrical target 22.

During assembly, the target retaining ring 46 is first placed on the exterior 28 of the target 22. Once the wire 50 is affixed within the radial groove 60, the target retaining ring 46 is slid forward to hold the wire 50 in place. With this arrangement, the target retaining ring 46 is captured on the exterior 28 of the cylindrical target 22 between the end 24 and the external shoulder 44. It is to be appreciated that the external shoulder 44, the radial groove 60, and the internal shoulder 40 and stop 42 can be machined into the cylindrical target 22 in a single target set up on a lathe.

Figure 4:
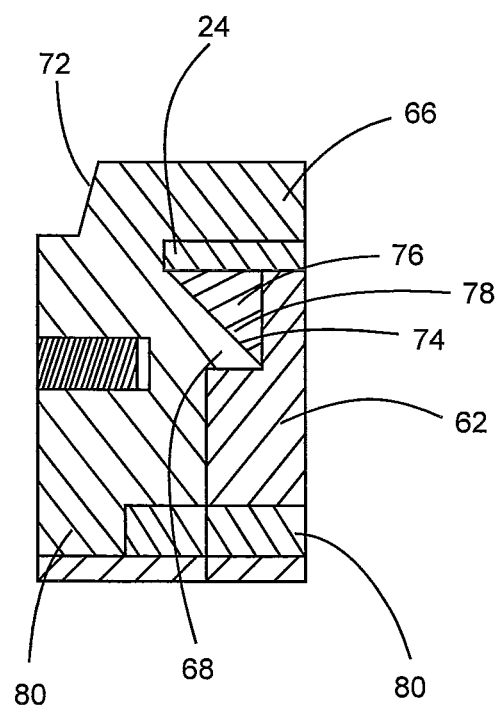
FIG. 4 is a view similar to the view shown in FIG. 3 showing a schematic representation of still another portion of the seal and fixation assembly of the invention shown in FIG. 2.
Figure 5:
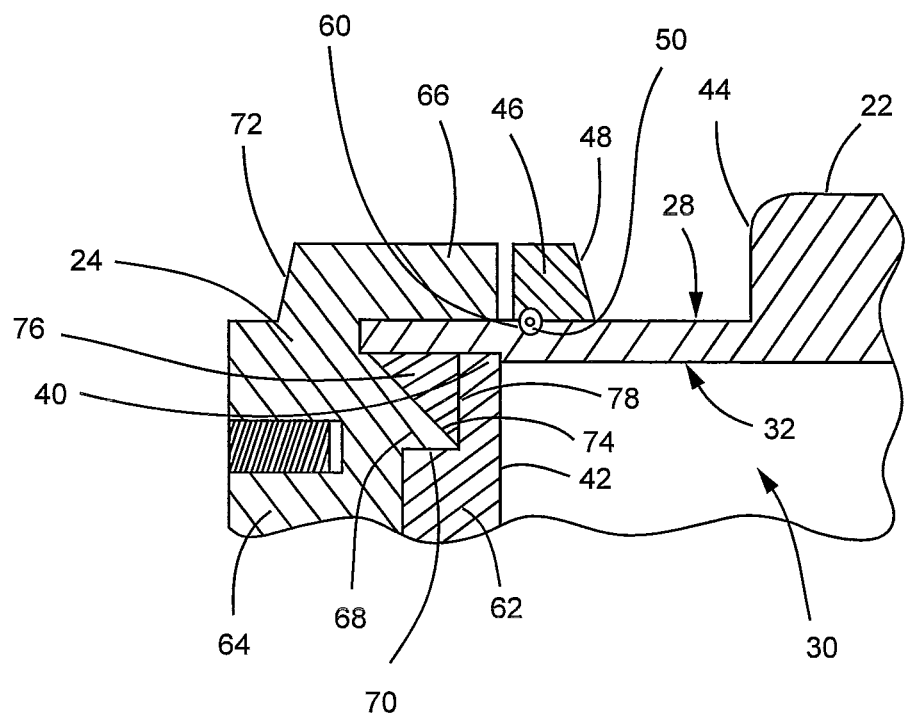
FIG. 5 is a view similar to the view shown in FIG. 3 showing a schematic representation of an additional portion of the seal and fixation assembly of the invention shown in FIG. 2.

With reference to FIGS. 2, 4, and 5 as needed, a seal plate 62 is disposed within the hollow interior 30 of the cylindrical target 22 and engages the stop 42 and the wider portion of the inside surface 32 of the target 22 (clearly shown in FIG. 5). An end cap 64 is disposed on and engages the end 24 of the cylindrical target 22. The end cap 64 includes an external portion 66 that engages the exterior 28 of the cylindrical target 22, and an internal portion 68 that engages a ledge 70 of the seal plate 62 (see FIG. 5). The external portion 66 of the end cap 64 has an external tapered surface 72 that faces away from the end 24 of the cylindrical target 22. The internal portion 68 of the end cap 64 has a beveled surface 74 that extends from the inside surface 32 of the target 22 to the seal plate 62. A sealing element 76, for instance an O-ring, is disposed between and engages the inside surface 32 of the target 22, surface 78 of the seal plate 62, and the beveled surface 74 of the internal portion 68 of the end cap 64. With further reference to FIG. 2, the end cap 64 is connected to the seal plate 62 by a plurality of bolts 80. As can now be appreciated by those skilled in the art, the inside surface 32 adjacent the end 24, the surface 78 of the seal plate 62, and the beveled surface 74 of the end cap 64 provide three sealing surfaces in a conical gland seal design.

It is to be appreciated that the end cap 64, the seal plate 62, and the sealing element 76 can be pre-assembled as a single piece, with the seal plate 62 being loosely connected to the end cap 64 by the bolts 80, thus leaving the end cap 64 with approximately 0.25 inch of travel available between the end cap 64 and the seal plate 62. Accordingly, the sealing element 76 is normally not compressed prior to assembly, in contrast to the sealing element 76 shown in FIG. 2, which depicts the end cap 64, the seal plate 62, and the sealing element 76 when fully fastened. When assembled with the cylindrical target 22, the seal plate 62 will seat against the stop 42 within the hollow interior 30 of the target 22. Because the sealing surfaces are hidden or protected within the target 22 between the end cap 64 and the seal plate 62, there is minimal risk to damaging any of these parts during normal maintenance or target change.

Figure 6:
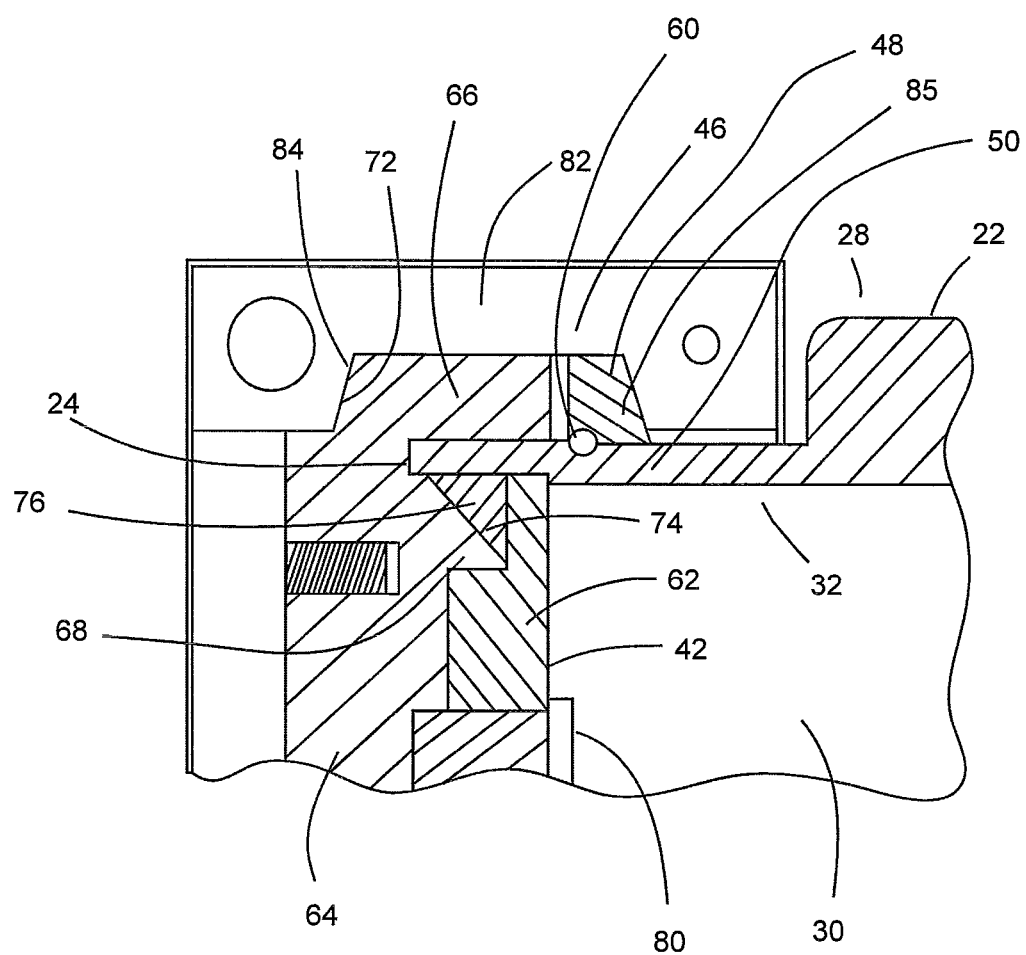
FIG. 6 is an end view of the rotating cylindrical magnetron electrode shown in FIG. 1.

As shown in FIGS. 2 and 6, a clamp 82 is disposed on the end 24 of the cylindrical target 22 over the end cap 64 and the target retaining ring 46. The clamp 82 includes two opposing internal tapered surfaces 84, 85. The first internal tapered surface 84 mirrors and engages the external tapered surface 72 of the external portion 66 of the end cap 64. The second internal tapered surface 85 mirrors and engages the external tapered surface 48 of the target retaining ring 46. Engagement of the end cap 64 and the target retaining ring 46 with the clamp 82 causes the internal portion 68 to move within the hollow interior 30 of the cylindrical target 22 in a direction toward the stop 42 due to the engagement between the external tapered surfaces 72, 48 of the end cap 64 and the target retaining ring 46, respectively, and the internal tapered surfaces 84, 85 of the clamp 82. As a result, the sealing element 76 becomes compressed between the inside surface 32 of the cylindrical target 22, the seal plate 62, and the beveled surface 74 of the internal portion 68 of the end cap 64, as shown in FIG. 6.

In particular, as the clamp 82 is applied to the end cap 64 and the target retaining ring 46, the end cap 64 is drawn into the cylindrical target 22 and the tapering surfaces 72, 48, 84, 85 begin to seat the sealing element 76 on the seal plate 62, the inside surface 32 of the target 22, and the beveled surface 74 of the internal portion 68 of the end cap 64. The wire 50 prevents the target retaining ring 46 from moving forward so that all of the clamping force is directed into the cylindrical target 22 to assure a rigid and leak-free mechanical connection. It is to be appreciated that the clamp 82 may be a two-piece clamp assembly affixed together by bolts.

Figure 7:
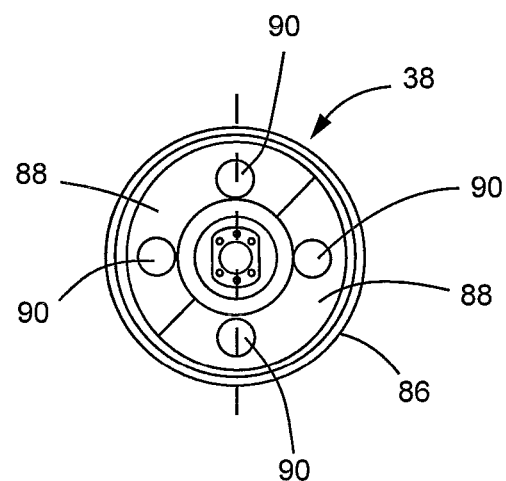
FIG. 7 is an enlarged view of the right end portion of the rotating cylindrical magnetron electrode (shown within the area A in FIG. 1) showing a portion of a cylindrical target, and a seal and fixation assembly of the invention.

With reference to FIGS. 2 and 7, the seal and fixation assembly 38 can further include a retaining member 86 disposed on the end 24 of the cylindrical target 22 over the clamp 82. A retaining plate 88 is disposed within the retaining member 86 and covers the end cap 64. The retaining plate 88 may be secured to the end cap 64 by fasteners 90.

It is to be appreciated that the seal and fixation assembly 38 according to this embodiment creates a seal design whereby target tubes can be manufactured on the same lathe in a single setup. The seal uses a large O-ring sealing element 76 to provide a large seal surface and, thus, an improved water-to-vacuum seal. The seal design minimizes risk of scratching of the sealing surfaces of the cylindrical target 22 or the end cap 64. Also, the seal design provides a target fixation, which requires minimal hardware and labor for assembly, thus reducing user maintenance time.

While several embodiments of a seal and fixation assembly for a rotating cylindrical magnetron electrode were described in the foregoing detailed description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are embraced within their scope.

The invention claimed is:

1. A seal and fixation assembly for a rotating cylindrical magnetron electrode, the seal and fixation assembly comprising:
   a cylindrical target having an exterior and a hollow interior defining an inside surface of the cylindrical target, the inside surface including an internal shoulder proximate to an end of the cylindrical target forming a stop within the hollow interior of the target;
   a target retaining ring disposed about the exterior of the cylindrical target, the target retaining ring having an external tapered surface;
   a seal plate disposed within the hollow interior of the cylindrical target, the seal plate engaging the stop and the inside surface of the cylindrical target;
   an end cap disposed on the end of the cylindrical target, the end cap including an external portion engaging the exterior of the cylindrical target and an internal portion engaging the inside surface of the cylindrical target, wherein the external portion includes an external tapered surface and the internal portion includes a beveled surface;
   a sealing element disposed between and engaging the inside surface of the cylindrical target, the seal plate, and the beveled surface of the internal portion of the end cap; and
   a clamp disposed on the end of the cylindrical target over the end cap and the target retaining ring, the clamp including a pair of opposing internal tapered surfaces that respectively engage the external tapered surfaces of the end cap and the target retaining ring,
   wherein engagement of the end cap and the target retaining ring with the clamp causes the internal portion of the end cap to move within the hollow interior of the cylindrical target in a direction toward the stop so that the sealing element becomes compressed between the inside surface of the cylindrical target, the seal plate, and the beveled surface of the internal portion of the end cap.

2. The seal and fixation assembly of claim 1, wherein the clamp comprises a first section over a first portion of the end cap and a second section over a second portion of the end cap, first fasteners mounting the clamp to secure the first and second sections together, and second fasteners spaced from, and positioned within, periphery of the clamp to secure the clamp to the end cap.

3. The seal and fixation assembly of claim 1, further comprising a radial groove in a surface of the exterior of the cylindrical target and an elongated member in the groove, wherein the elongated member captures the target retaining ring on the exterior of the cylindrical target between the end and the internal shoulder.

4. The seal and fixation assembly of claim 3, wherein engagement of the end cap and the target retaining ring with the clamp biases the target retaining ring against the elongated member.

5. A rotating cylindrical magnetron electrode, comprising:
   an elongated cylindrical member having a first end and an opposite second end, an exterior and a hollow interior defining an inside surface of the cylindrical member, the inside surface including a first internal shoulder proximate to the first end of the cylindrical member forming a first stop within the hollow interior of the member, and a second internal shoulder proximate to the second end of the cylindrical member forming a second stop within the hollow interior of the member spaced from the first step;
   a magnet mounted within the cylindrical member between and spaced from the first and second stops;
   a first target retaining ring disposed about the exterior of the cylindrical member adjacent the first end, the first target retaining ring having an external tapered surface facing in the direction of the second end;
   a second target retaining ring disposed about the exterior of the cylindrical member adjacent the second end, the second target retaining ring having an external tapered surface facing in the direction of the first end;
   a first seal plate disposed within the hollow interior of the cylindrical target at the first end, the first seal plate engaging the first stop and a portion of the inside surface of the cylindrical member at the first end;
   a first end cap disposed on the first end of the cylindrical member, the first end cap including an external portion engaging the exterior of the cylindrical member at the first end and an internal portion engaging the inside surface of the cylindrical member at the first end, wherein the external portion of the first end cap includes an external tapered surface and the internal portion includes a beveled surface;
   a first sealing element disposed between and engaging the inside surface of the cylindrical member at the first end, the first seal plate, and the beveled surface of the internal portion of the first end cap;
   a first clamp disposed on the first end of the cylindrical member over the first end cap and the first target retaining ring, the first clamp including a pair of opposing internal tapered surfaces that respectively engage the external tapered surfaces of the first end cap and the first target retaining ring;
   a second seal plate disposed within the hollow interior of the cylindrical target at the second end, the second seal plate engaging the second stop and a portion of the inside surface of the cylindrical member at the second end;
   a second end cap disposed on the second end of the cylindrical member, the second end cap including an external portion engaging the exterior of the cylindrical member at the second end and an internal portion engaging the inside surface of the cylindrical member at the second end, wherein the external portion of the second end cap includes an external tapered surface and the internal portion includes a beveled surface;
   a second sealing element disposed between and engaging the inside surface of the cylindrical member at the second end, the second seal plate, and the beveled surface of the internal portion of the second end cap; and
   a second clamp disposed on the second end of the cylindrical member over the second end cap and the second target retaining ring, the second clamp including a pair of opposing internal tapered surfaces that respectively engage the external tapered surfaces of the second end cap and the second target retaining ring,
   wherein engagement of the first end cap and the first target retaining ring with the first clamp causes the internal portion of the first end cap to move within the hollow interior of the cylindrical member at the first end in a direction toward the first stop so that the first sealing element becomes compressed between the inside surface of the cylindrical member at the first end, the first seal plate, and the beveled surface of the internal portion of the first end cap and engagement of the second end cap and the second target retaining ring with the second clamp causes the internal portion of the second end cap to move within the hollow interior of the cylindrical member at the second end in a direction toward the second stop so that the second sealing element becomes compressed between the inside surface of the cylindrical member at the second end, the second seal plate, and the beveled surface of the internal portion of the second end cap.

6. The rotating cylindrical magnetron electrode of claim 5, wherein the first clamp comprises a first section over a first portion of the first end cap and a second section over a second portion of the first end cap, and first fasteners mounting the first clamp to secure the first and second sections of the first clamp together and second fasteners spaced from, and positioned within, periphery of the first clamp to secure the first clamp to the first end cap, and the second clamp comprises a first section over a first portion of the second end cap and a second section over a second portion of the second end cap, and third fasteners mounting the second clamp to secure the first and second sections of the second clamp together, and fourth fasteners spaced from, and positioned within, periphery of the second clamp to secure the second clamp to the second end cap.

7. The rotating cylindrical magnetron electrode of claim 5, further comprising a first radial groove in a surface of the exterior of the cylindrical member adjacent the first end and a first member in the first groove, wherein the first member captures the first target retaining ring on the exterior of the cylindrical target between the first end and the first internal shoulder and a second radial groove in a surface of the exterior of the cylindrical member adjacent the second end and a second member in the second groove, wherein the second member captures the second target retaining ring on the exterior of the cylindrical member between the second end and the second internal shoulder.

8. The rotating cylindrical magnetron electrode of claim 7, wherein engagement of the first end cap and the first target retaining ring with the first clamp biases the first target retaining ring against the first member, and engagement of the second end cap and the second target retaining ring with the second clamp biases the second target retaining ring against the second member.

9. The rotating cylindrical magnetron electrode of claim 7, further comprising a drive shaft for rotating the cylindrical magnetron electrode.

10. The rotating cylindrical magnetron electrode of claim 5, further comprising a first radial groove in a surface of the exterior of the cylindrical member adjacent the first end and a first member in the first groove, wherein the first member captures the first target retaining ring on the exterior of the cylindrical target between the first end and the first internal shoulder, and a second radial groove in a surface of the exterior of the cylindrical member adjacent the second end and a second member in the second groove, wherein the second member captures the second target retaining ring on the exterior of the cylindrical member between the second end and the second internal shoulder, and wherein the first clamp comprises a first section over a first portion of the first end cap and a second section over a second portion of the first end cap, and first fasteners mounting the first clamp to secure the first and second sections of the first clamp together and second fasteners spaced from, and positioned within, periphery of the first clamp to secure the first clamp to the first end cap, and the second clamp comprises a first section over a first portion of the second end cap and a second section over a second portion of the second end cap, and third fasteners mounting the second clamp to secure the first and second sections of the second clamp together and fourth fasteners spaced from, and positioned within, periphery of the second clamp to secure the second clamp to the second end cap.

11. The rotating cylindrical magnetron electrode of claim 10, wherein engagement of the first end cap and the first target retaining ring with the first clamp biases the first target retaining ring against the first member, and engagement of the second end cap and the second target retaining ring with the second clamp biases the second target retaining ring against the second member.

12. The rotating cylindrical magnetron electrode of claim 11, comprising a drive shaft for rotating the cylindrical magnetron electrode,
wherein the first and second end caps each have an inside groove to receive the first and second ends, respectively, of the cylindrical member.

13. A method of sealing at least a first end of a rotating cylindrical magnetron electrode having the first end and an opposite second end, the method comprising:
providing a cylindrical target having the first end and the second end, and an exterior and a hollow interior defining an inside surface of the cylindrical target, the inside surface including a first internal shoulder proximate to the first end of the cylindrical target forming a first stop within the hollow interior of the target, and a second internal shoulder proximate to the second end of the cylindrical target forming a second stop within the hollow interior of the target;
disposing a first target retaining ring about the exterior of the cylindrical target adjacent the first end, the first target retaining ring having an external tapered surface;
disposing a first seal plate within the hollow interior of the cylindrical target to engage the first stop and the inside surface of the cylindrical target;
disposing a first end cap on the first end of the cylindrical target, the first end cap including an external portion to engage the exterior of the cylindrical target adjacent the first end, and an internal portion engaging the inside surface of the cylindrical target adjacent the first end, wherein the external portion includes an external tapered surface and the internal portion includes a beveled surface;
disposing a first sealing element between and engaging the inside surface of the cylindrical target, the seal plate, and the beveled surface of the internal portion of the first end cap; and
disposing a first clamp on the first end of the cylindrical target over the first end cap and the first target retaining ring, the first clamp including a pair of opposing internal tapered surfaces that respectively engage the external tapered surfaces of the end cap and the target retaining ring, wherein engagement of the first end cap and the first target retaining ring with the first clamp causes the internal portion of the first end cap to move within the hollow interior of the cylindrical target in a direction toward the first stop so that the sealing element to compress the inside surface of the cylindrical target, the seal plate, and the beveled surface of the internal portion of the end cap.

14. The method according to claim 13, wherein the disposing a first target retaining ring about the exterior of the cylindrical target adjacent the first end of the target is accomplished by sliding the first target retaining ring over the first end with the external tapered surface of the first target retaining ring facing the second end of the electrode, securing an elongated member over the exterior of the target at a position between the first end and the first retaining ring and biasing the first retaining ring toward the first end to move the first retaining ring against the elongated member.

15. The method according to claim 13, further comprising:

disposing a second target retaining ring about the exterior of the cylindrical target adjacent the second end, the second target retaining ring having an external tapered surface;

disposing a second seal plate within the hollow interior of the cylindrical target to engage the second stop and the inside surface of the cylindrical target;

disposing a second end cap on the second end of the cylindrical target, the second end cap including an external portion to engage the exterior of the cylindrical target adjacent the second end and an internal portion engaging the inside surface of the cylindrical target adjacent the second end, wherein the external portion includes an external tapered surface and the internal portion includes a beveled surface;

disposing a second sealing element between and engaging the inside surface of the cylindrical target, the second seal plate, and the beveled surface of the internal portion of the second end cap; and disposing a second clamp on the first end of the cylindrical target over the second end cap and the second target retaining ring, the second clamp including a pair of opposing internal tapered surfaces that respectively engage the external tapered surfaces of the second end cap and the second target retaining ring, wherein engagement of the second end cap and the second target retaining ring with the second clamp causes the internal portion of the second end cap to move within the hollow interior of the cylindrical target in a direction toward the second stop to compress the second sealing element between the inside surface of the cylindrical target, the second seal plate, and the beveled surface of the internal portion of the second end cap.

16. The method according to claim 15, wherein the disposing a first target retaining ring about the exterior of the cylindrical target adjacent the first end of the target is accomplished by sliding the first target retaining ring over the first end with the external tapered surface of the first target retaining ring facing the second end of the electrode, securing a first elongated member over the exterior of the target at a position between the first end and the first retaining ring and biasing the first retaining ring toward the first end to move the first retaining ring against the first elongated member, and wherein the disposing a second target retaining ring about the exterior of the cylindrical target adjacent the second end of the target is accomplished by sliding the second target retaining ring over the second end with the external tapered surface of the second target retaining ring facing the first end of the electrode, securing a second elongated member over the exterior of the target at a position between the second end and the second retaining ring and biasing the second retaining ring toward the second end to move the second retaining ring against the second elongated member.

* * * * *